US010979785B2

(12) United States Patent
Cheung et al.

(10) Patent No.: US 10,979,785 B2
(45) Date of Patent: Apr. 13, 2021

(54) MEDIA PLAYBACK APPARATUS AND METHOD FOR SYNCHRONOUSLY REPRODUCING VIDEO AND AUDIO ON A WEB BROWSER

(71) Applicant: HANWHA TECHWIN CO., LTD., Seongnam-si (KR)

(72) Inventors: Sweung Won Cheung, Changwon-si (KR); Jong Chan Park, Changwon-si (KR)

(73) Assignee: Hanwha Techwin Co., Ltd., Seongnam-si (KR)

(*) Notice: Subject to any disclaimer, the term of this patent is extended or adjusted under 35 U.S.C. 154(b) by 128 days.

(21) Appl. No.: 15/833,235

(22) Filed: Dec. 6, 2017

(65) Prior Publication Data

US 2018/0213301 A1    Jul. 26, 2018

Related U.S. Application Data

(60) Provisional application No. 62/457,203, filed on Feb. 10, 2017.

(30) Foreign Application Priority Data

Jan. 20, 2017   (KR) .......... 10-2017-0009963
Jul. 11, 2017   (KR) .......... 10-2017-0087661

(51) Int. Cl.
*H04N 21/858*    (2011.01)
*H04N 21/8547*   (2011.01)
(Continued)

(52) U.S. Cl.
CPC ......... *H04N 21/8586* (2013.01); *G06F 16/40* (2019.01); *G06F 16/957* (2019.01);
(Continued)

(58) Field of Classification Search
None
See application file for complete search history.

(56) References Cited

U.S. PATENT DOCUMENTS 8,749,610 B1 * 6/2014 Gossweiler ......... H04L 12/1827
                                              348/14.08
8,842,218 B2 * 9/2014 Nishikawa ............. H04N 5/602
                                              348/425.4
(Continued)

FOREIGN PATENT DOCUMENTS

CN       1784737 A      6/2006
CN     103891303 A      6/2014
(Continued)

OTHER PUBLICATIONS

Garsiel-Irish, How Browsers Work: Behind the scenes of modern browsers—HTML5 Rocks, Aug. 5, 2011, https://www.html5rocks.com/en/tutorials/internals/howbrowserswork/ (Year: 2011).*

(Continued)

*Primary Examiner* — Ricky Chin
(74) *Attorney, Agent, or Firm* — McLean IP Global; Jason Y. Pahng

(57) ABSTRACT

A media playback apparatus and a method for synchronously reproducing video and audio on a web browser are provided. In the media playback apparatus, audio is buffered to be outputted at a time point at which video is outputted, thereby synchronizing the outputs of video and audio. The media playback apparatus may output the video in synchronization with the audio even when video and audio are decoded by different decoders. Therefore, it is possible to implement a decoder separately from a decoder embedded in a web browser in a non-plug-in environment, thereby reducing the dependency on the codec format of the media.

20 Claims, 11 Drawing Sheets

(51) Int. Cl.
- *G06F 16/40* (2019.01)
- *G06F 16/958* (2019.01)
- *H04N 21/8543* (2011.01)
- *H04N 21/43* (2011.01)
- *H04N 21/4782* (2011.01)
- *G06F 16/957* (2019.01)
- *H04L 29/06* (2006.01)
- *H04N 21/434* (2011.01)

(52) U.S. Cl.
CPC .......... *G06F 16/958* (2019.01); *H04L 65/608* (2013.01); *H04N 21/43* (2013.01); *H04N 21/4302* (2013.01); *H04N 21/434* (2013.01); *H04N 21/4307* (2013.01); *H04N 21/4341* (2013.01); *H04N 21/4343* (2013.01); *H04N 21/4346* (2013.01); *H04N 21/4782* (2013.01); *H04N 21/8543* (2013.01); *H04N 21/8547* (2013.01)

(56) References Cited

U.S. PATENT DOCUMENTS

| | | | | |
|---|---|---|---|---|
| 9,031,382 B1* | 5/2015 | Kaiser | ................... | G11B 27/00 386/248 |
| 9,384,588 B2 | 7/2016 | Liu et al. | | |
| 2007/0081563 A1* | 4/2007 | Seo | ........................ | H04J 3/0632 370/542 |
| 2009/0272251 A1* | 11/2009 | Georges | ................... | G10H 1/00 84/609 |
| 2010/0153827 A1* | 6/2010 | Koster | ................ | H04L 12/1868 714/799 |
| 2010/0266050 A1* | 10/2010 | Keidar | ................... | H04H 20/18 375/240.25 |
| 2012/0066768 A1* | 3/2012 | Bland | ..................... | G06F 21/10 726/26 |
| 2012/0128058 A1* | 5/2012 | Bakharov | ........ | H04N 21/85406 375/240.01 |
| 2012/0140018 A1* | 6/2012 | Pikin | ..................... | H04L 65/605 348/14.02 |
| 2012/0194734 A1* | 8/2012 | McConville | ... | H04N 21/234327 348/441 |
| 2012/0317473 A1 | 12/2012 | Pullen et al. | | |
| 2013/0038792 A1* | 2/2013 | Quigley | ................. | A61H 19/00 348/515 |
| 2013/0044260 A1* | 2/2013 | Vestergaard | ........... | H04N 19/40 348/515 |
| 2014/0003799 A1* | 1/2014 | Soroushian | ........... | H04N 19/46 386/353 |
| 2014/0047413 A1* | 2/2014 | Sheive | ................... | H04L 65/403 717/110 |
| 2014/0079368 A1* | 3/2014 | Sasaki | .................. | H04N 5/0736 386/207 |
| 2014/0089796 A1* | 3/2014 | Hyun | ..................... | G06F 3/0484 715/716 |
| 2014/0269776 A1* | 9/2014 | Bomfim | ........... | H04N 21/23608 370/503 |
| 2015/0052219 A1 | 2/2015 | Staudinger et al. | | |
| 2015/0256874 A1* | 9/2015 | Kim | ................. | H04N 21/42215 725/151 |
| 2015/0326914 A1* | 11/2015 | Semba | ............. | H04N 21/43615 725/78 |
| 2015/0382050 A1* | 12/2015 | Le Nerriec | ............. | H04L 45/16 725/80 |
| 2016/0173954 A1* | 6/2016 | Speelmans | ......... | H04N 21/6125 725/116 |
| 2016/0286260 A1* | 9/2016 | Lawrence | ........... | H04N 21/4307 |
| 2017/0289214 A1* | 10/2017 | Cho | .................... | H04L 65/4069 |

FOREIGN PATENT DOCUMENTS

| | | | | |
|---|---|---|---|---|
| CN | 105453582 A | | 3/2016 | |
| JP | 2015-528961 A | | 10/2015 | |
| KR | 10-2004-0096718 | * | 11/2004 | ............. G11B 20/10 |
| KR | 1020040096718 A | | 11/2004 | |
| KR | 1020050098461 A | | 10/2005 | |
| KR | 101538114 B1 | | 7/2015 | |
| WO | 2016022606 A1 | | 2/2016 | |
| WO | WO-2016-022606 | * | 2/2016 | ......... H04N 21/2387 |

OTHER PUBLICATIONS

Communication dated Jun. 5, 2018, issued by the Korean Intellectual Property Office in counterpart Korean Application No. 10-2017-0087661.

Korean Office Action dated Dec. 20, 2018; Appln. No. 10-2017-0087661.

CN Office Application dated Mar. 3, 2020 for CN Application No. 201810049239.6.

CN Office Application dated Feb. 8, 2021 for CN Application No. 201810049239.6.

* cited by examiner

MEDIA PLAYBACK APPARATUS AND METHOD FOR SYNCHRONOUSLY REPRODUCING VIDEO AND AUDIO ON A WEB BROWSER

CROSS-REFERENCE TO THE RELATED APPLICATIONS

This application claims priority from U.S. Provisional Application No. 62/457,203 filed on Feb. 10, 2017 and Korean Patent Application Nos. 10-2017-0009963 filed on Jan. 20, 2017 and 10-2017-0087661 filed on Jul. 11, 2017 in the Korean Intellectual Property Office, and the disclosures of which are incorporated herein by reference in their entireties.

BACKGROUND

1. Technical Field

Apparatuses and methods consistent with exemplary embodiments relate to a media playback apparatus and method for synchronously reproducing video and audio on a web browser, and more particularly, to an apparatus and method for reproducing media by synchronizing video and audio when the video or audio is decoded on a container basis.

2. Description of the Related Art

In order for a user to play back media data on a web browser through the Internet, there is provided a method of using a plug-in in which a codec, a decoder, a renderer and the like are written in native code. As representative examples of web browser plug-ins, ActiveX interface and Netscape Plugin Application Programming Interface (NPAPI) interface are widely used.

ActiveX interface was developed by Microsoft company using a combination of two technologies: Component Object Model (COM) and Object Linking and Embedding (OLE). However, in a narrow sense, it refers to an ActiveX interface control used in the form of an add-on in Internet Explorer browser which is a web browser. ActiveX interface is used to play media in the Internet Explorer web browser.

NPAPI interface is an application programming interface (API) developed for Netscape browsers, and is similar in functionality to ActiveX interface of Internet Explorer browser. NPAPI interface is an API provided for using an external application program in a plug-in format in order to enhance the function of a web browser, and was used primarily for the web environment in its embryonic stage. In other words, it was developed to play music and videos on early web pages. For example, there are Java Applet program, Adobe Flash program, Real Player program and the like.

However, since a plug-in is sometimes abused by hackers to distribute malicious code, many mainstream web browsers no longer support plug-ins. In the case of NPAPI interface, Google company, which produces and distributes Chrome browser, no longer supports NPAPI interface after the release of Chrome version 45 browser. In addition, ActiveX interface is no longer supported by Microsoft Edge browser, which is the default browser for Windows 10 operating system.

As a method for playing back media on a web browser without a plug-in, decoding and rendering are performed based on a video tag of HTML5. HTML5 is HTML's fifth markup language developed by World Wide Web Consortium (W3C) and web browser developers, and provides an environment in which media can be played back without a plug-in through a video tag. It has full support for HTML5 video tags since Chrome 4.0 browser, Explorer 9.0 browser, Firefox 3.5 browser, Safari 4.0 browser, and Opera 10.5 browser.

When decoding is performed using a video tag, high resolution video and high fps video can be processed with excellent performance. However, there are restrictions on the video formats supported by a video tag and it currently supports only three formats: MP4 format, WebM format, and Ogg format0. More specifically, it supports codec formats such as H.264 of MP4 format, Advanced Audio Coding (AAC) format, MP3 format, VP8 format, VP9 format, Vorbis format and Opus of WebM format, Theora of Ogg format and Vorbis format. H.265 which is a video codec format or G.711 and G.726 which are audio codec formats are not supported by a video tag.

The drawback of the video tag due to the restrictions on the codec formats can be alleviated by using a decoder implemented in JavaScript code. Since a JavaScript decoder can perform decoding without limitation on a video format, it is possible to decode media of a codec format not supported by a video tag.

However, despite the use of a decoder, there is still a limitation. A video tag player/decoder basically performs decoding by receiving video on the basis of a container obtained by packaging a plurality of frames. Therefore, when video and audio are decoded using different decoders of a video tag decoder and a JavaScript decoder, synchronization may be a problem. For example, in a case where video in the H.264 format is decoded by a video tag player/decoder on a container basis and audio in the G.711 format is decoded by a JavaScript decoder, if the number of frames used in the container is 30 and frames per second (fps) is 1, the video may be outputted up to 30 seconds later, and the audio may be played back first.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a method of reproducing media without a problem of synchronization between video and audio.

Further, one or more exemplary embodiments provide a media playback method in which synchronization between video and audio is not a problem when video is decoded on a container basis.

According to an aspect of an embodiment, there is provided a media playback apparatus for synchronously reproducing video and audio on a web browser, the media playback apparatus including: a receiving unit configured to receive media data generated in a media service apparatus using a communication protocol which supports web services; a data separator configured to separate the received media data into video data and audio data; a container unit configured to package frames constituting the video data together with a unit number and convert the frames into chunk data; a media restorer configured to restore video by decoding the chunk data by a decoder embedded in the web browser, and provide time information on a time point at which the restored video is outputted on a chunk data basis when the restored video is outputted; and an audio synchronizer configured to output the audio data in synchronization with the restored video based on the time information provided on the chunk data basis.

According to an aspect of another embodiment, there is provided a media service apparatus for transmitting media data to a media playback apparatus, the media service apparatus including: a module storage unit configured to store a script converter to reproduce the media data on a web browser of the media playback apparatus; and at least one processor configured to implement: a module transmitting unit configured to transmit the script converter to the media playback apparatus in response to a connection between the media service apparatus and the media playback apparatus being established; a packetizing unit configured to packetize the media data to generate a transmission packet; and a web server configured to establish the connection and transmit the transmission packet to the media playback apparatus in response to a request from the media playback apparatus, wherein the script converter is configured to receive the communication packet through the connection, package video frames included in the communication packet together with a unit number, convert the video frames into chunk data, and output audio data included in the communication packet in synchronization with the chunk data based on time information on a time point at which the chunk data is decoded and outputted by a media restorer installed in the media playback apparatus.

According to an aspect of still another exemplary embodiment, there is provided a media playback apparatus for synchronously reproducing video and audio on a web browser, the media playback apparatus comprising: a receiving unit configured to receive media data generated in a media service apparatus using a communication protocol which supports web services; a data separator configured to separate the received media data into first media data and second media data; a container unit configured to package frames constituting the first media data together with a unit number and convert the frames into chunk data; a media restorer configured to restore first media by decoding the chunk data by a decoder embedded in the web browser, and provide time information on a time point at which the restored first media is outputted on a chunk data basis when the restored first media is outputted; and a sync unit configured to output the second media data in synchronization with the restored first media based on the time information provided on the chunk data basis.

According to the exemplary embodiments, it is possible to reproduce the synchronized media by restoring video and audio in accordance with the container specification.

Further, synchronization is not a problem even if the video and audio are decoded by different decoders, thereby providing an environment in which video and audio can be separately processed.

Also, the dependency on the codec format is reduced because audio of a codec format not supported by a video tag can be used without a synchronization problem.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
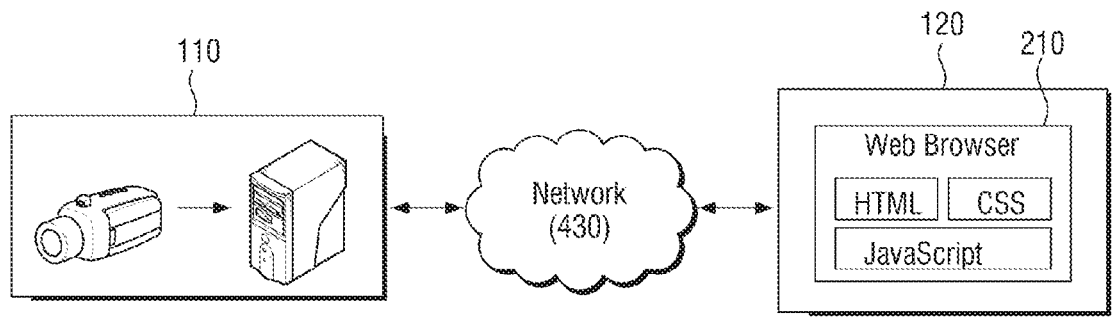
FIG. 1 shows a system for media playback according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated components, but do not preclude the presence or addition of one or more other components.

Expressions such as "at least one of," when preceding a list of elements, modify the entire list of elements and do not modify the individual elements of the list.

FIG. 1 shows a system for media playback according to an exemplary embodiment. The system shown in FIG. 1 includes a media service apparatus 110, a media playback apparatus 120, and a network 430 connecting the two apparatuses 110 and 120.

The media service apparatus 110 includes a computing or processing device suitable for providing computing services to one or more video playback apparatuses. For example, the media service apparatus 110 includes a device, such as a network camera, a network video recorder (NVR) and a digital video recorder (DVR), capable of generating or storing a video stream and transmitting the video stream to user devices. The media service apparatus 110 may be also referred to as a media service system, in which a server and a network camera are included.

The media playback apparatus 120 includes a computing or processing device suitable for interacting with the media service apparatus 110 or other computing user devices via the network 430. For example, the media playback apparatus 120 may include a desktop computer, a mobile phone or smart phone, a personal digital assistant (PDA), a laptop computer and a tablet computer.

The media data (e.g., video) captured or stored in real time by the media service apparatus 110 is transmitted through the network 430 at the request of the media playback apparatus 120. The user may play back or seek the media data transmitted through a user interface implemented on a web browser 210 of the media playback apparatus 120. In particular, the web browser 210 may include a commonly known browser such as Google Chrome browser, Microsoft Explorer browser, Mozilla Firefox browser and Apple Safari browser installed on a desktop computer or mobile phone, and may also include software applications that are created separately using application programing interfaces (APIs) or resources of the web browser.

Hereinafter, real time streaming protocol (RTSP) and/or real-time transport protocol (RTP) streams that are transmitted through a WebSocket protocol will be described with reference to FIG. 2 to FIG. 5. The WebSocket may be used as a network communication scheme between the media service apparatus 110 and the media playback apparatus 120.

Figure 2:
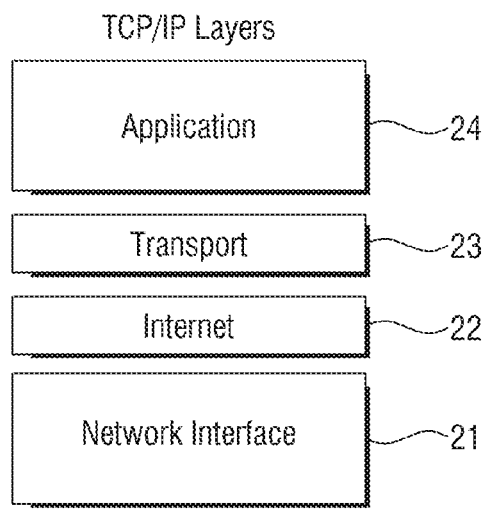
FIG. 2 is a diagram illustrating a Transmission Control Protocol/Internet Protocol (TCP/IP) 4-layer model that is hierarchically defined for communication between devices.

FIG. 2 is a diagram illustrating a transmission control protocol/internet protocol (TCP/IP) 4-layer model that is hierarchically defined for communication between devices. The four layers include a network interface layer 21, an Internet layer 22, a transport layer 23 and an application layer 24. Since the WebSocket enables transmission of messages on top of the transport layer 23, in order to use the WebSocket connection, a TCP transport connection may have to be first established between the media service apparatus 110 and the media playback apparatus 120. Once the WebSocket connection is established between the media service apparatus 110 and the media playback apparatus 120, for example, via a 3-way handshake process, the WebSocket communication is performed by transmitting WebSocket packets. The WebSocket connection and the WebSocket packet will be described in detail with reference to FIGS. 3 to 5 below.

Figure 3:
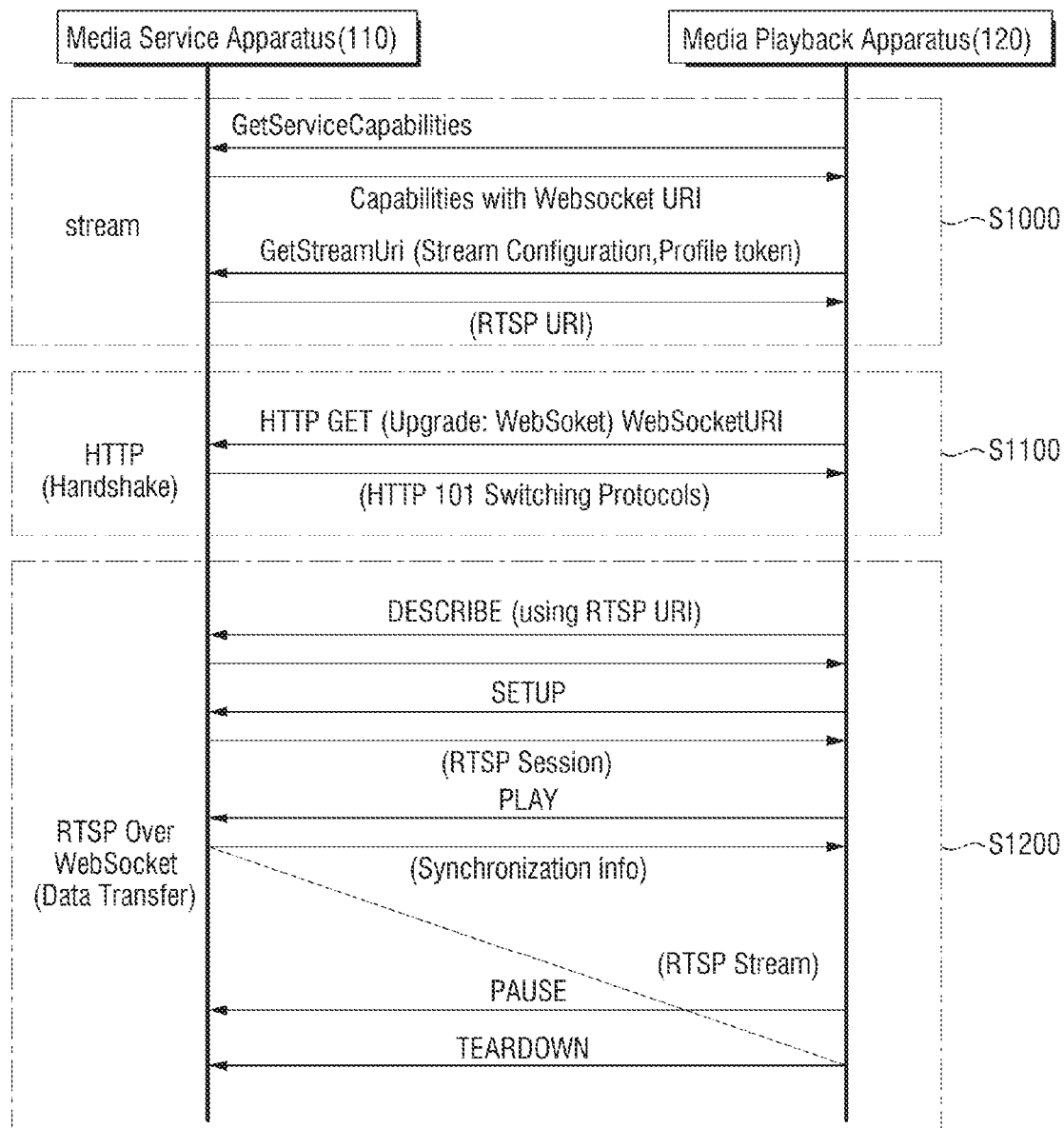
FIG. 3 shows a process of performing a WebSocket connection between a media service apparatus and a media playback apparatus.

FIG. 3 shows a process of performing a WebSocket connection between the media service apparatus 110 and the media playback apparatus 120. The media playback apparatus 120 requests the media service apparatus 110 to initiate a WebSocket connection using a WebSocket uniform resource identifier (URI). The WebSocket URI may be obtained using a command of GetServiceCapabilities. The WebSocket URI is expressed, for example, as "ws:// 192.168.0.5/webSocketServer" (operation S1000).

The media playback apparatus 120 may transmit a WebSocket upgrade request to the media service apparatus 110. The media service apparatus 120 may respond with code 101, which is a status code to approve a protocol change request (operation S1100).

After the WebSocket connection is established between the media service apparatus 110 and the media playback apparatus 120, data is exchanged through the RTSP/RTP protocol transmitted over a WebSocket instead of a hypertext transfer protocol (HTTP)/1.1 protocol. DESCRIBE, SETUP, PLAY, PAUSE and TEARDOWN in FIG. 3 are RTSP commands. A DESCRIBE request includes a uniform resource locator (URL). A response message to DESCRIBE also includes a description of the request. A SETUP request specifies whether a single media stream should be transmitted. A PLAY request is a request to play one or all media streams, and multiple requests are possible. A PAUSE request is a command to pause the playback of one or all media streams. The playback may be restarted in response to a PLAY request. A TEARDOWN request is a command to terminate a session. The playback of all the media streams may be stopped by the TEARDOWN request and all sessions related to the data are also released (operation S1200).

An example of a request message sent from the media playback apparatus 120 and a response message of the media service apparatus 110 in the WebSocket connection process shown in FIG. 3 is provided in Table 1 as follows.

TABLE 1

Media Playback Apparatus 120 -> Media Service Apparatus 110
 GET /webSocketServer HTTP/1.1
 Host: 192.168.0.1
 Upgrade: websocket
 Connection: Upgrade
 Sec-WebSocket-Key: dGhlIHNhbXBsZSBub25jZQ==
 Origin: http://example.com
 Sec-WebSocket-Protocol: rtsp.onvif.org
 Sec-WebSocket-Version: 13.
Media Service Apparatus 110 -> Media Playback Apparatus 120
 HTTP/1.1 101 Switching Protocols
 Upgrade: websocket
 Connection: Upgrade
 Sec-WebSocket-Accept: s3pPLMBiTxaQ9kYGzzhZRbK+xOo=
 Sec-WebSocket-Protocol: rtsp.onvif.org This WebSocket connection is made according to a WebSocket protocol that follows the HTML5 standard. In particular, since the WebSocket connection continuously supports bidirectional communication, data can be continuously transmitted and received between the media service apparatus 110 and the media playback apparatus 120 without being disconnected.

Figure 4:
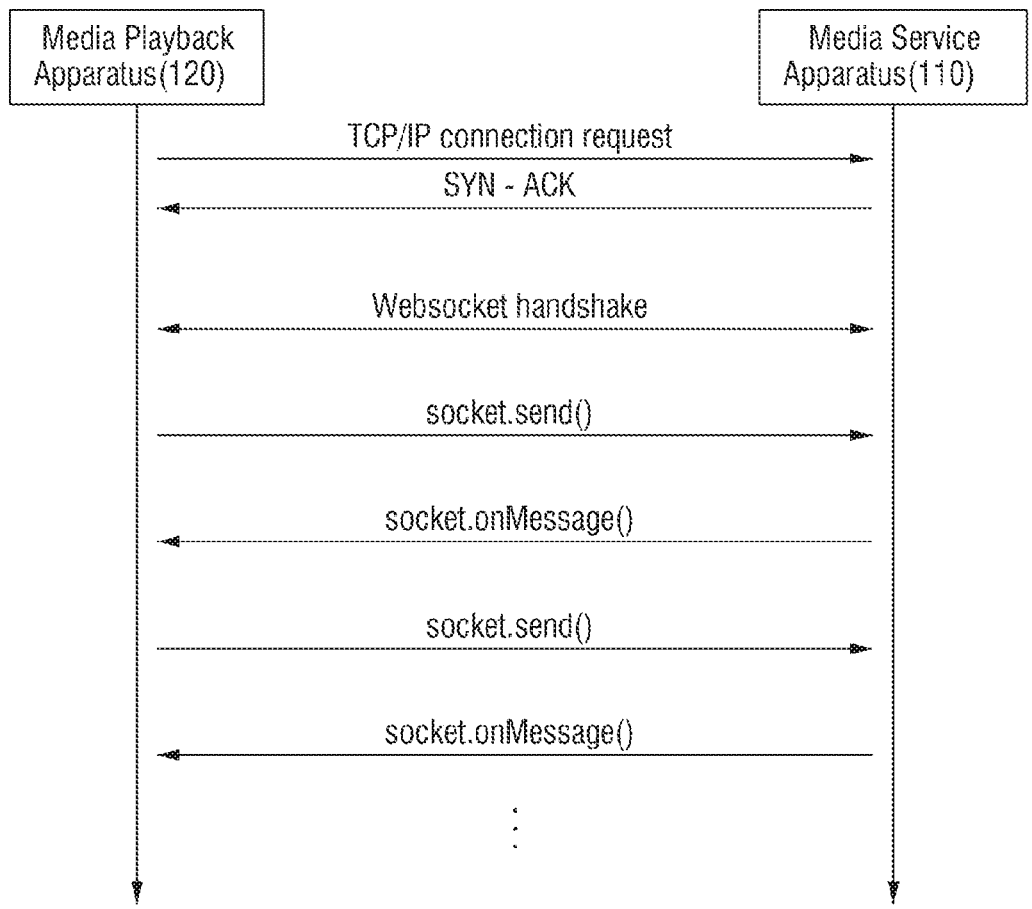
FIG. 4 shows an example of a process of transmitting and receiving data through a WebSocket connection.

FIG. 4 shows an example of a process of transmitting and receiving data through a WebSocket connection. Referring to FIG. 4, first, the media playback apparatus 120 transmits a TCP/IP connection request message to the media service apparatus 110, and the media service apparatus 110 accepts it and transmits a TCP response message (SYN-ACK) to the media playback apparatus 120, thereby establishing a TCP/IP connection. A TCP transport connection may be formed by a pair of a local TCP socket and a remote TCP socket. Each TCP socket is defined by at least an identifier such as a port number and an IP address. A user diagram protocol (UDP)/IP-based connection may be established between the media playback apparatus 120 and the media service apparatus 110 instead of the TCP/IP-based connection.

Then, when the WebSocket connection is established through a handshake process between the media playback apparatus 120 and the media service apparatus 110, continuous data transmission/reception between them can be performed thereafter. That is, the media playback apparatus 120 transmits a media streaming request to the media service apparatus 110 in the form of a transmission WebSocket packet (socket.send), and the media service apparatus 110 transmits a media stream to the media playback apparatus 120 in the form of a response WebSocket packet (socket.on-Message). This process can be performed continuously between the media playback apparatus 120 and the media service apparatus 110 until media stream transmission is stopped or completed.

Figure 5:
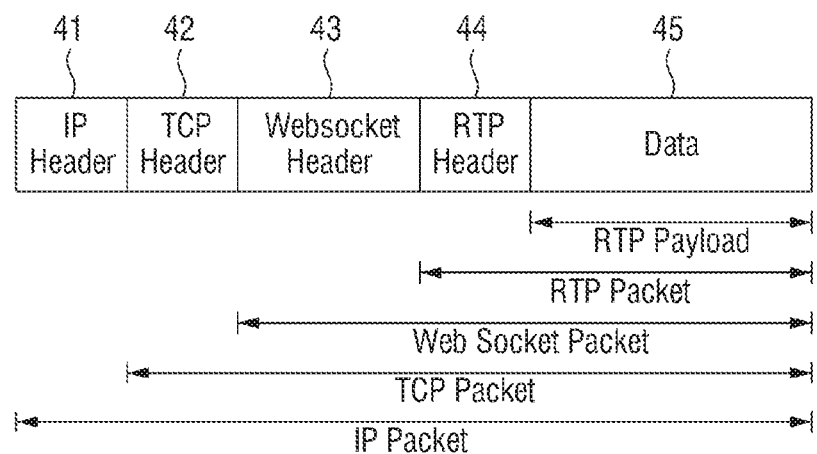
FIG. 5 is a diagram illustrating a structure of a communication packet transmitted through a network interface.

FIG. 5 is a diagram illustrating a structure of a communication packet transmitted through the network interface 21. When an RTP header 44 is added to an RTP payload corresponding to data 45, the RTP payload becomes an RTP packet. The RTP packet may be equal to a WebSocket payload, and a WebSocket header 43 may be added to the RTP packet to become a WebSocket packet. The WebSocket packet may be equal to a TCP payload, and a TCP header 42 is added to the WebSocket packet to become a TCP packet. Finally, the TCP packet may be equal to an IP payload, and an IP header 41 is added to the TCP packet, thereby completing a communication packet, that is, an IP packet. The process of completing the IP packet and a process of removing each header are performed in both the media service apparatus 110 and the media playback apparatus 120.

Since the communication between the media service apparatus 110 and the media playback apparatus 120 is performed through a HTML5-based WebSocket protocol described above with reference to FIGS. 2 to 5, a module that performs RTSP/RTP transmission/reception control may be implemented by script code that can be parsed in HTML5. Accordingly, media playback using the RTSP/RTP protocol can be implemented in a web browser of the HTML5 environment without separately installing a plug-in as in a conventional case.

The network communication scheme between the media service apparatus 110 and the media playback apparatus 120 has been described so far. Hereinafter, a configuration and operation method of the media service apparatus 110 and the media playback apparatus 120 will be described with reference to FIGS. 6 to 18.

Figure 6:
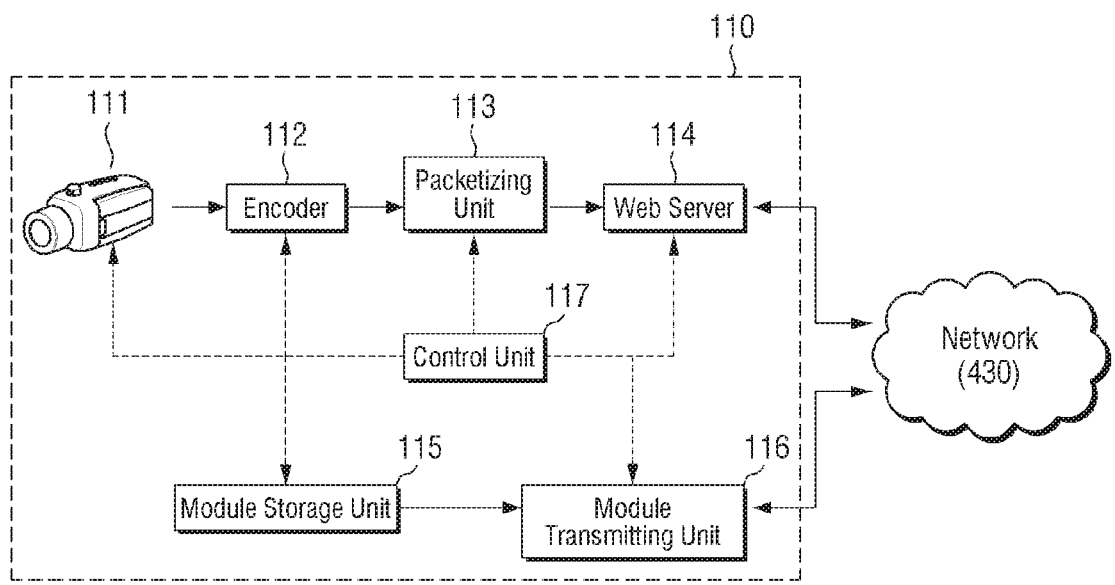
FIG. 6 shows a configuration of the media service apparatus according to an exemplary embodiment.

FIG. 6 shows a configuration of the media service apparatus 110 according to an exemplary embodiment. In one exemplary embodiment, the media service apparatus 110 includes a real-time video camera 111, an encoder 112, a packetizing unit 113, a web server 114, a module storage unit 115, a module transmitting unit 116, and a control unit 117. The encoder 112, the packetizing unit 113, the web server 114, and the control unit 117 may be included in one or more processors.

The real-time video camera 111 may capture images in real time, and the capturing includes a case of performing both video capturing and audio recording and a case of performing only video capturing.

The encoder 112 is configured to compress and encode the media captured by the real-time video camera 111. The encoding of the encoder 112 is not necessarily performed using a specific codec supported by a decoder embedded in the web browser, but may be performed in an arbitrary codec format.

The packetizing unit 113 packetizes the encoded media data to generate a transmission packet. The packetization may be performed by dividing the media data into appropriate lengths to facilitate transmission via the network 430, or collectively assigning control information, such as a receiving address, to each data in an appropriate length if the media data is short. In this case, the control information is located in the header of the packet. The transmission packet is in the form of the above-described WebSocket packet.

The packetizing unit 113 may perform packetization of the media data according to a method requested by the media playback apparatus 120. For example, when the media playback apparatus 120 requests video on a frame-by-frame basis, the packetizing unit 113 may generate a transmission packet in a frame format, and when the media playback apparatus 120 requests video on the basis of a container supported by a decoder embedded in a web browser, the packetizing unit 113 may generate a transmission packet in a container format.

The web server 114 establishes a communication session with the media playback apparatus 120. For example, a WebSocket connection may be established between the web server 114 of the media service apparatus 110 and the media playback apparatus 120 through a handshake process between them. Thereafter, according to the request of the media playback apparatus 120, the transmission packet generated by the packetizing unit 113 is transmitted through the web server 114.

The module storage unit 115 may store a script converter necessary to play back media in the media playback apparatus 120. The script converter is a module, which allows the media playback apparatus 120 to play back media in a web browser in an HTML5 environment without installing a plug-in or a separate application program, as code written in a script that can be parsed by a web browser. The script converter may be code written in JavaScript code in one embodiment. The script converter will be described later with reference to FIGS. 8 to 11.

The module transmitting unit 116 may transmit the script converter stored in the module storage unit 115 to the media playback apparatus 120. The module transmitting unit 116 transmits the script converter in response to a connection being established between the media playback apparatus 120 and the media service apparatus 110 via the network 430.

The control unit 117 may control other configuration modules in the media service apparatus 110. For example, when the media playback apparatus 120 connects to the web server 114 through the network 430, the script converter stored in the module storage unit 115 is transmitted to the media playback apparatus 120 through the module transmitting unit 116. In this case, the control unit 117 sends/receives signals to/from the respective modules to control the operation to be performed smoothly.

The operation method will be described based on the description of the configuration modules of the media service apparatus 110 of FIG. 6. When the media playback apparatus 120 is connected to the web server 114 via the network 430, the module transmitting unit 116 transmits the script converter stored in the module storage unit 115 to the media playback apparatus 120. When the script converter is installed in the media playback apparatus 120, the user requests media playback through the user interface. Accordingly, the media service apparatus 110 encodes the real-time live media captured by the real-time video camera 111 in the encoder 112 and packetizes the media data into transmission packets in accordance with the frame or container format in the packetizing unit 113, and transmits them to the media playback apparatus 120 via the web server 114.

Figure 7:
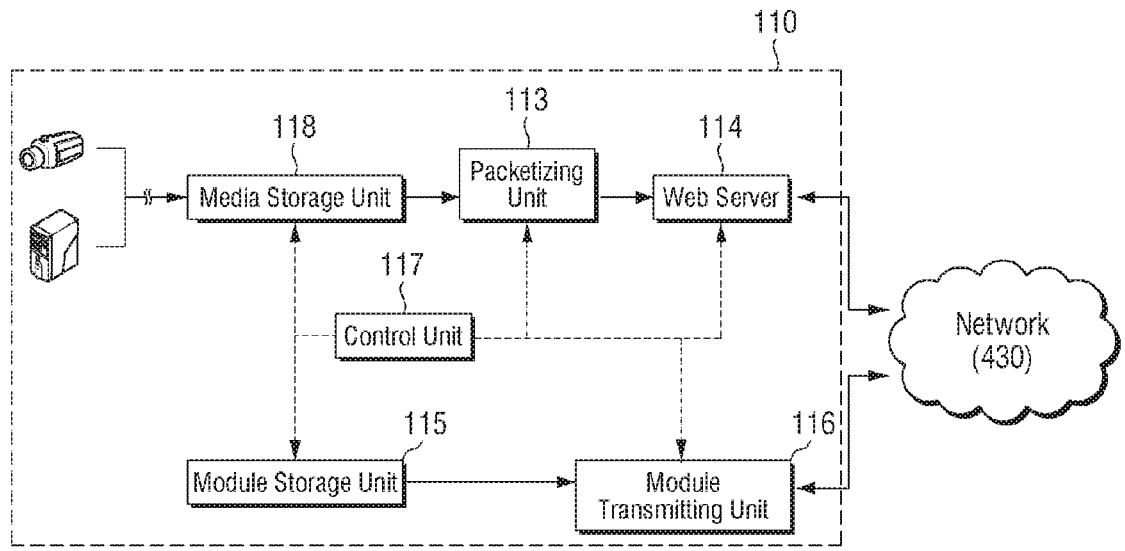
FIG. 7 shows a configuration of the media service apparatus according to another exemplary embodiment.

FIG. 7 shows a configuration of the media service apparatus 110 according to another exemplary embodiment. The media service apparatus 110 of FIG. 6 represents an embodiment for transmitting real-time live media using the real-time video camera 111, and the media service apparatus 110 of FIG. 7 represents an embodiment for transmitting media stored in a media storage unit 118.

The media storage unit 118 includes a network video recorder (NVR) or a personal video recorder (PVR). However, FIG. 7 will be described in conjunction with the network video recorder. The media storage unit 118 receives media data from a camera or a server and compresses and stores the received media data. When there is a request for transmission of the stored media data from the media playback apparatus 120, the media service apparatus 110 packetizes the media data stored in the media storage unit 118 in the packetizing unit 113 and transmits the packetized data through the web server 114. The packetizing unit 113, the web server 114, the module storage unit 115, the module transmitting unit 116 and the control unit 117 among the configuration modules of the media service apparatus 110 have been described with reference to FIG. 6, and thus, a redundant description thereof will be omitted.

FIGS. 8 to 11 show a script converter transmitted from the media service apparatus 110 to the media playback apparatus 120 according to various exemplary embodiments. The script converter may be implemented as a script that can be parsed by a web browser. With reference to FIGS. 8 to 11, a case where the script converter is implemented in JavaScript code will be described.

Figure 8:
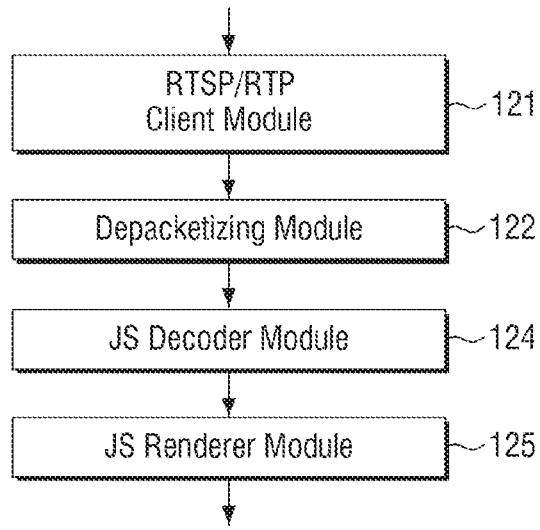
FIG. 8 shows a script converter according to an exemplary embodiment.

FIG. 8 shows a script converter according to an exemplary embodiment. The script converter shown in FIG. 8 may restore video on a frame-by-frame basis, and may include an RTSP/RTP client module 121, a depacketizing module 122, a JavaScript (JS) decoder module 124 and a JS renderer module 125.

The RTSP/RTP client module 121 is configured to support RTSP/RTP communication with the media service apparatus 110. It is possible to receive a transmission packet from the web server 114 of the media service apparatus 110 via the RTSP/RTP client module 121. In related art, it may not able to process media data according to the RTSP/RTP protocol on a web browser without a plug-in. According to the present exemplary embodiment, the RTSP/RTP client module 121 may allow to reliably receive data transmitted through the RTSP/RTP protocol even if the web browser uses a HTTP scheme.

The JS decoder module 124 may decompress the encoded media data to decode the encoded media data. The JS decoder module 124 is implemented in JavaScript code similarly to other modules of the script converter. Since the JS decoder module 124 is implemented in JavaScript code, unlike the decoder embedded in the web browser, it may be possible to perform decoding in an arbitrary codec format without limitation to the codec format. It may be also possible to perform decoding on a frame-by-frame basis.

If the JS decoder module 124 is implemented in JavaScript code according to the embodiment of FIG. 8, the JS decoder module 124 may be represented by the code shown in the following Table 2, for example.

TABLE 2

```
function HevcDecoder ( ) {
    var _name = "HevcDecoder";
    var self = this;
    this._decoderParameters = null;
    this._isRequestActive = false;
    this._player = null;
    this._requestContext = null;
```

TABLE 2-continued

```
    this._requestContextQueue = [ ];
    this.pushRequestContext = function (requestContext) {
        self._requestContextQueue.push(requestContext);
    };
    this.decode = function ( ) {
        if (self._isRequestActive) {
            return;
        }
        if (self._requestContextQueue.length) {
            self._isRequestActive = true;
            self._requestContext = self._requestContextQueue.pop( );
            self._playStream(self._requestContext.stream);
        }
    };
    this._createDecodeCanvas = function(parentElement) {
        self.canvas = document.createElement("canvas");
        self.canvas.style.display = "none";
        self.canvas.id = "decode-canvas";
        parentElement.appendChild(self.canvas);
        self.ctx = self.canvas.getContext("2d");
    };
    this._playStream = function (buffer) {
        this._reset( );
        this._handleOnLoad(buffer);
    }
    this._onImageDecoded = function (image) {
        var width = image.get_width( );
        var height = image.get_height( );
        this.canvas.width = width;
        this.canvas.height = height;
        this._imageData = this.ctx.createImageData(width, height);
        image.display(this._imageData, function (displayImageData) {
            var itemId =
self._requestContext.itemIds[self._requestContext.currentFrameIndex];
            var payload = self._requestContext.payload;
            if (height > payload.displayHeight) {
                payload.displayHeight = height;
            }
            if (!(itemId in self._requestContext.dependencies)) {
                if (width > payload.displayWidth) {
                    payload.displayWidth = width;
                }
                payload.frames.push({
                    canvasFrameData: displayImageData.data,
                    itemId: itemId,
                    width: width,
                    height: height
                });
            }
            self._requestContext.currentFrameIndex++;
            if (self._requestContext.currentFrameIndex >=
self._requestContext.itemIds.length) {
                self._requestContext,callback(payload);
                selt._isRequestActive = false;
                self.decode( ); // Decode next queued request
            }
        });
    };
    .
    .
    .
    this._createDecodeCanvas(document.documentElement);
    this._reset( );
}
```

The JS renderer module 125 may render the decoded media and display it on an output device such as a monitor or the like. The JS renderer module 125 converts video data in a YUV format into video data in a RGB format using Web Graphics Library (WebGL). WebGL is a web-based graphical library that is available through JavaScript code and allows the creation of a three-dimensional (3D) graphical interface.

Figure 9:
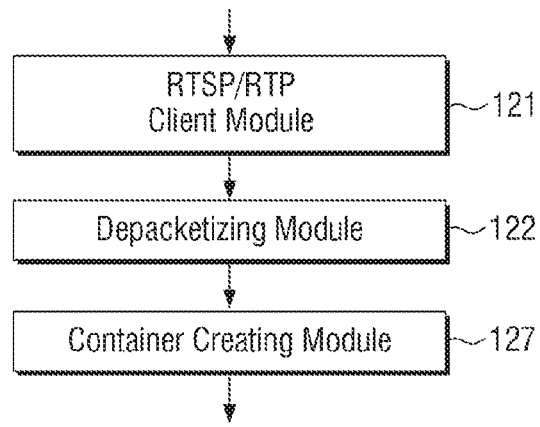
FIG. 9 shows a script converter according to another exemplary embodiment.

FIG. 9 shows another a script converter according to another exemplary. The script converter of FIG. 9 may restore video in a container format, and may include the RTSP/RTP client module 121, the depacketizing module 122, and a container creating module 127. The RTSP/RTP client module 121 and the depacketizing module 122 are the modules described with reference to FIG. 8, and thus, a redundant description will be omitted.

As shown in FIG. 9, the script converter includes the container creating module 127 unlike in FIG. 8. The container creating module 127 may form a container by packaging the frames together with a unit number when the video is not packaged on a container basis. Further, video frames and audio may be packaged together with a unit number. In this case, the container creating module 127 may variably adjust the unit number according to frames per second (FPS) of video. Data obtained by allowing the container creating module 127 to package video frames in a unit number or package video frames and audio in a unit number is referred to as chunk data.

A container may refer to a digital multimedia container format supported by a video tag such as a Moving Picture Experts Group (MPEG)-Dynamic Adaptive Streaming over HTTP (DASH) container. For example, containers for H.264, VP8/VP9, Vorbis/Opus may correspond to MP4 format, WebM format, and Ogg format, respectively. Since the container creating module 127 can configure data in a container format compatible with the HTML5 video tag, it allows the media playback apparatus 120 to use the video tag without a compatibility problem even if the data is not transmitted in the container format from an image capturing device. That is, the container creating module 127 provides an environment in which a video tag can be used without modification of an image capturing device installed previously.

Figure 10:
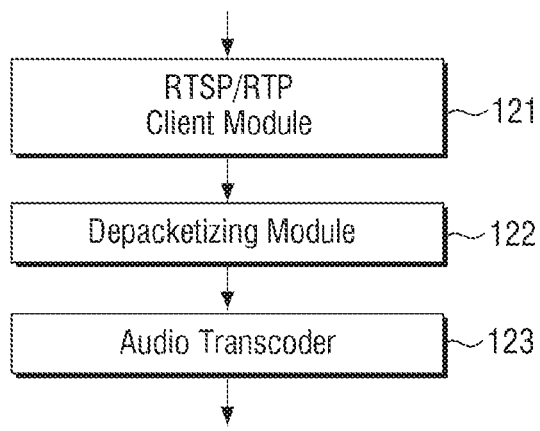
FIG. 10 shows a script converter according to another exemplary embodiment.

FIG. 10 shows a script converter according to another exemplary embodiment. The script converter of FIG. 10 may perform audio reproduction, and may include the RTSP/RTP client module 121, the depacketizing module 122, and an audio transcoder 123. The RTSP/RTP client module 121 and the depacketizing module 122 are described with reference to FIG. 8, and thus, a redundant description will be omitted.

The audio transcoder 123 may perform transcoding when audio data is configured in a codec format not supported by a decoder embedded in a web browser. Transcoding refers to the conversion of the codec format. The audio transcoder 123 decompresses the audio data and compresses the audio data again in a codec format different from the previous format. For example, the audio data of the G.711 codec format not supported by the video tag, which is a decoder embedded in the web browser, is converted into the Advanced Audio Coding (AAC) codec format supported by the video tag.

Since the audio transcoder 123 converts the audio data into a codec format supported by a decoder embedded in the web browser, it provides an environment in which the audio data can be restored by using a decoder embedded in the web browser together with the video data and outputted without a synchronization problem.

Figure 11:
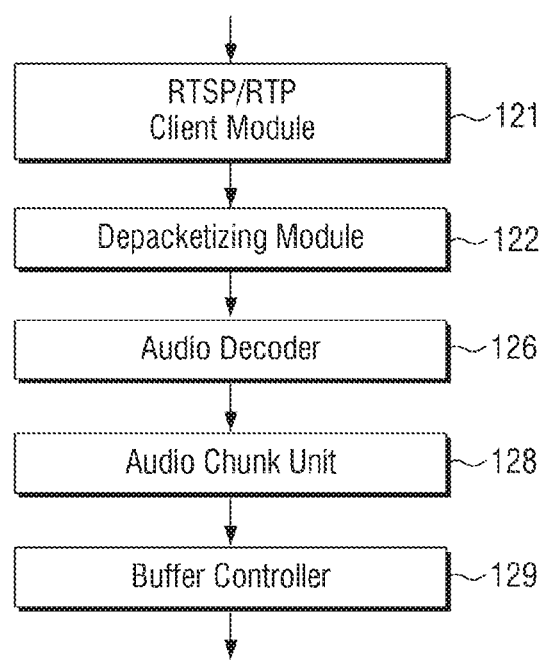
FIG. 11 shows a script converter according to another exemplary embodiment.

FIG. 11 shows a script converter according to still another exemplary embodiment. The script converter of FIG. 11 may perform audio reproduction similarly to the script converter of FIG. 10, but has a different configuration. The script converter of FIG. 11 includes the RTSP/RTP client module 121, the depacketizing module 122, an audio decoder 126, an audio chunk unit 128 and a buffer controller 129. The RTSP/RTP client module 121 and the depacketizing module 122 are described with reference to FIG. 8.

The audio decoder 126 may decode audio data. The audio decoder 126 may be implemented in JavaScript code, which is a script that can be parsed by a web browser, similarly to other modules.

Figure 12:
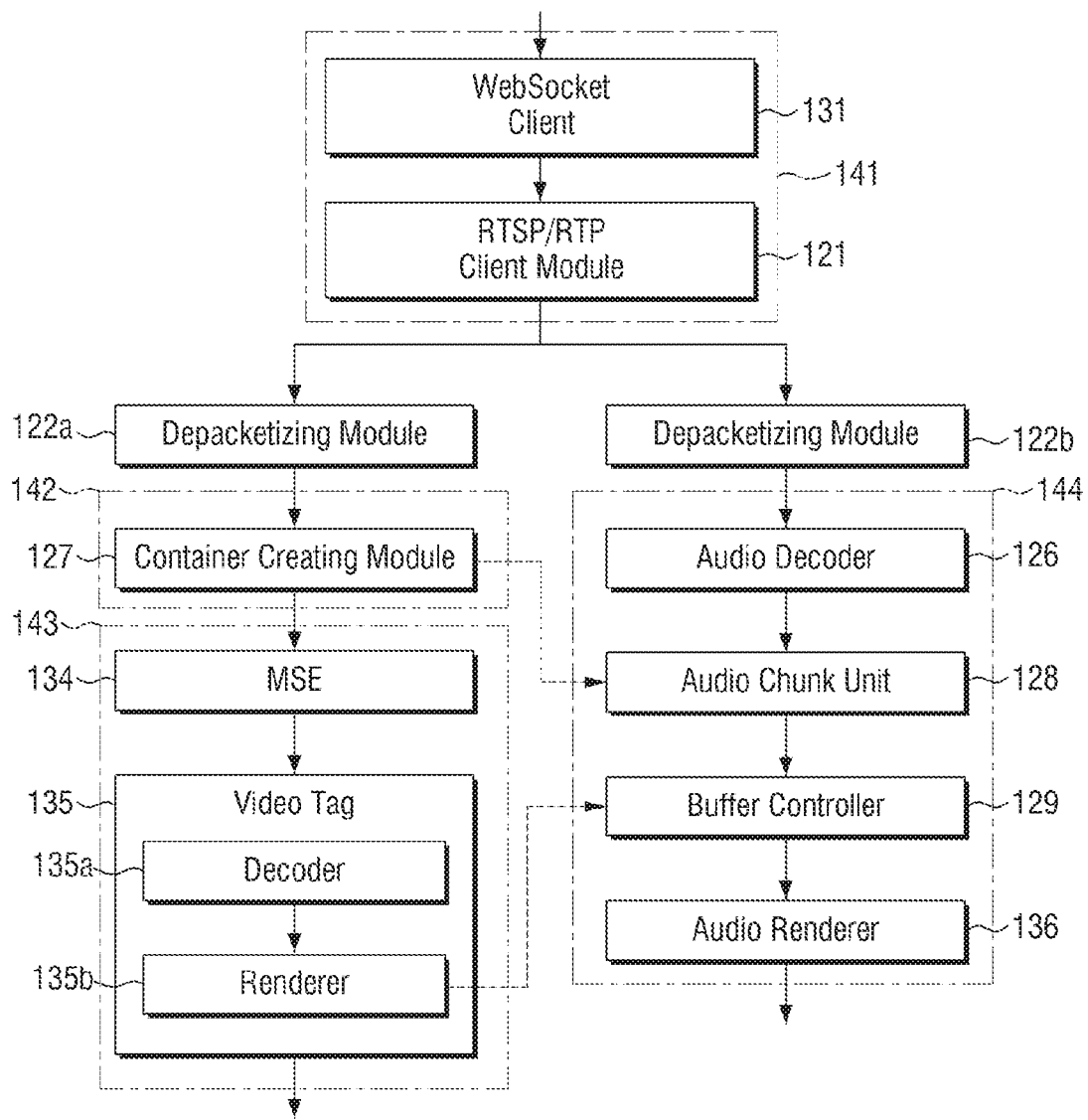
FIG. 12 shows the media playback apparatus according to an exemplary embodiment.

The audio data decoded by the audio decoder 126 is packaged into an audio chunk in the audio chunk unit 128. In this case, the audio chunk is generated by packaging the audio data together with a unit number of frames constituting the chunk data generated by the container creating module 127. That is, an audio chunk is generated based on the chunk data. FIG. 12 shows the media playback apparatus 120 including both the container creating module 127 and the audio chunk unit 128. The generation of an audio chunk will be described again with reference to FIG. 12.

Figure 13:
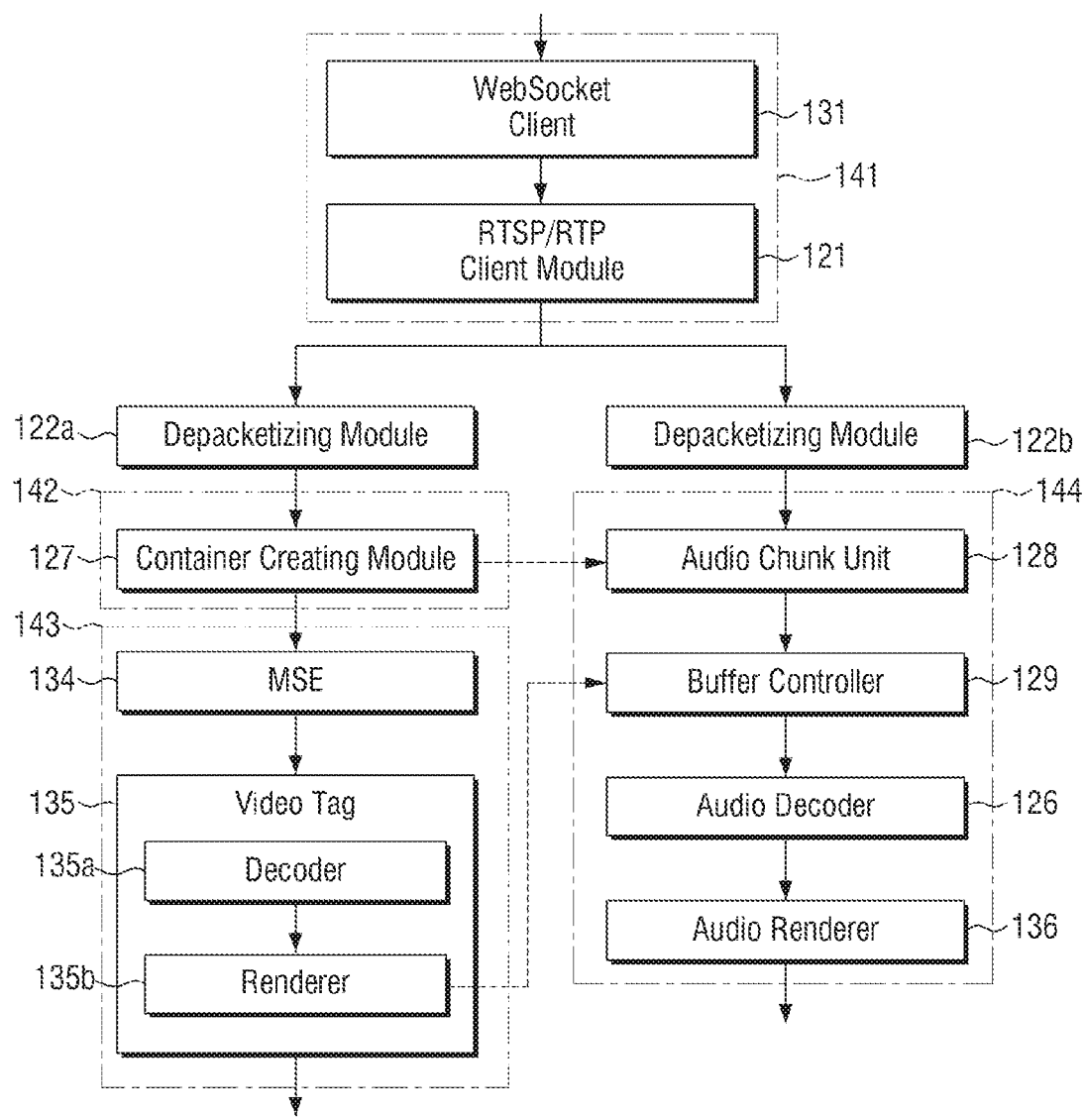
FIG. 13 shows the media playback apparatus according to another exemplary embodiment.

The buffer controller 129 receives an audio chunk from the audio chunk unit 128, buffers the audio chunk in an audio buffer, and provides the buffered audio chunk to an audio renderer 136. The audio renderer 136 is shown in FIGS. 12 and 13 as a configuration module of the media playback apparatus 120.

The buffer controller 129 receives time information from another module for restoring video and performs a function of synchronizing audio to video. The time information is information on a time point at which the chunk data is decoded and outputted by a media restorer 143 installed in the media playback apparatus 120. A start portion of the chunk data indicates a time point at which rendering is performed by a renderer in the media playback apparatus 120. The buffer controller 129 buffers or transmits the audio chunk to the audio renderer 136 so that audio can be outputted at a time point at which video is displayed through the time information, thereby synchronizing the video and the audio.

The script converter shown in FIG. 11 can be configured in a different order, and moves the audio decoder 126 to the rear end of the buffer controller 129. In this case, first, the buffer controller 129 synchronizes the chunk data and the audio data, and the audio decoder 126 decodes the buffered audio data.

The script converter described with reference to FIGS. 8 to 11 is transmitted from the media service apparatus 110 to the media playback apparatus 120 as the media playback apparatus 120 connects to the media service apparatus 110. Accordingly, it provides an environment in which media playback can be performed in the web browser 210 of the media playback apparatus 120 without a plug-in. That is, the script converter is installed in the media playback apparatus 120 to configure a system for media playback. The media playback apparatus 120 in which the script converter is installed will be described with reference to FIGS. 12 to 14 according to one or more exemplary embodiments.

Figure 14:
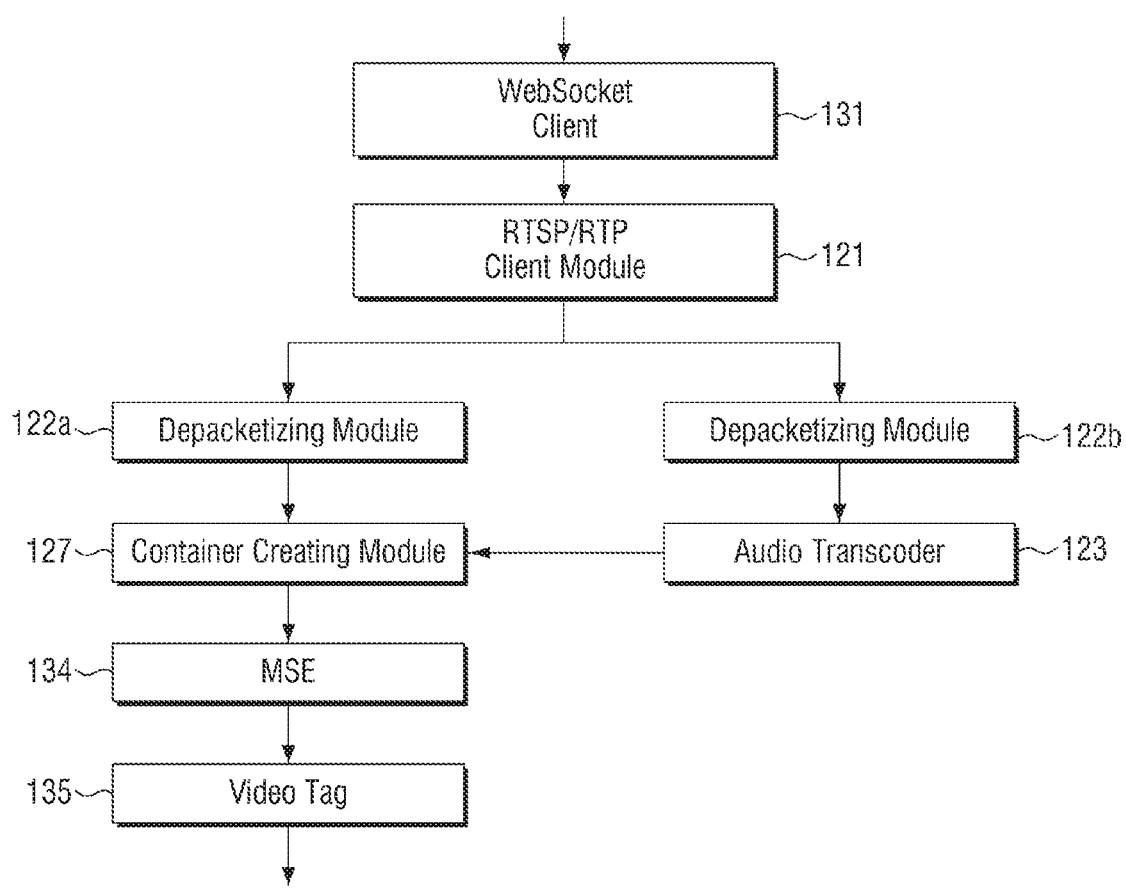
FIG. 14 shows the media playback apparatus according to another exemplary embodiment.

FIGS. 12 to 14 illustrate the media playback apparatus 120 according to exemplary embodiments. Main modules for media playback in the media playback apparatus 120 are configured by a script converter. Since the function of the script converter has been described with reference to FIGS. 8 to 11, the media playback apparatus 120 shown in FIGS. 12 to 14 will be described, with a focus on the structure and operation method.

FIG. 12 shows the media playback apparatus 120 according to an exemplary embodiment. The media playback apparatus 120 of FIG. 12 includes a receiving unit 141, a data separator, a container unit 142, the media restorer 143 and an audio synchronizer 144. In particular, the receiving unit 141, the data separator, the container unit 142 and the audio synchronizer 144 may be implemented in JavaScript code. The media playback apparatus 120 of FIG. 12 may be configured by receiving the script converter of FIGS. 9 and 11.

The receiving unit 141 receives the media data generated by the media service apparatus 110 using a communication protocol supporting the web service. In this case, the communication protocol supporting the web service may be an RTSP/RTP protocol transmitted over a WebSocket. The receiving unit 141 includes a WebSocket client 131 and the RTSP/RTP client module 121.

The web socket client 131 may establish a WebSocket connection with the web server 114 of the media service apparatus 110. The media playback apparatus 120 and the media service apparatus 110 send and receive a transmission packet through a handshake between the WebSocket client 131 and the web server 114, respectively.

The RTSP/RTP client module 121 performs a function of supporting RTSP/RTP communication in the user's web browser 210 as described in the embodiment of FIG. 8. Accordingly, the user can play back media through the web browser 210 of the HTML5 environment using the RTSP/RTP protocol without installing a separate plug-in.

The media data that has passed through the receiving unit 141 is separated into video data and audio data by the data separator. The video data is transmitted to a depacketizing module 122a along a lower left arrow, and the audio data is transmitted to a depacketizing module 122b along a lower right arrow from the RTSP/RTP client module 121, respectively. The depacketizing modules 122a and 122b depacketize the video data and the audio data. The depacketized video data and audio data are transmitted to the container unit 142 and the audio synchronizer 144, respectively.

The container unit 142 includes the container creating module 127. If the video data is not in the container format, the container creating module 127 packages the video frames together with a unit number and converts them into chunk data.

Figure 15:
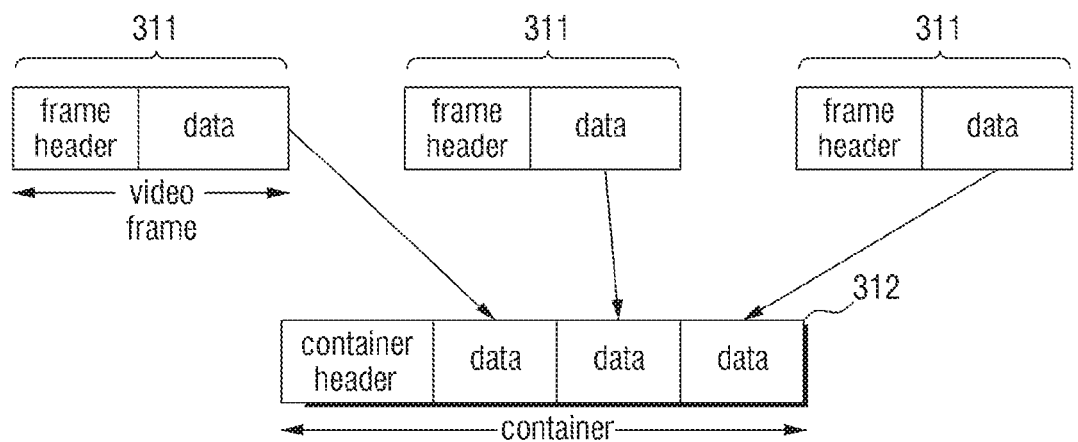
FIG. 15 shows a process of generating chunk data according to an exemplary embodiment.

A process of generating chunk data in the container creating module 127 will be described with reference to FIG. 15. Video frames 311 in FIG. 15 represent video data configured on a frame-by-frame basis, which is obtained by depacketization in the depacketizing module 122a. In this case, the video frames 311 are data compressed by various video codecs such as MPEG-2, H.264 and H.265.

When the depacketizing module 122a transmits the video frames 311 to the container creating module 127, the container creating module 127 determines whether the received data is in a container format using header information. Since the video frames 311 are data in a frame format, the container creating module 127 converts the video frames 311 into a container format in order to allow them to be processed in a mean squared error (MSE) module 134 and a video tag module 135.

The conversion from the frame format to the container format is performed by packaging a plurality of frames together with a unit number. In this case, the unit number may be variably selected according to frames per second (FPS) of the video data. FIG. 15 illustrates a process of generating chunk data when the unit number is three. The container creating module 127 generates a container header by parsing frame header information (frame size, prediction method (intra or inter), inter frame type (I, B or P), etc.) of each of the video frames 311, and packages the data of the video frames 311 and the container header to convert them into chunk data 312 in the container format. The chunk data 312 converted into the container format can be processed in the media restorer 143 including the MSE module 134 and the video tag module 135 without a compatibility problem.

Referring back to FIG. 12, an arrow with a dotted line is drawn from the container creating module 127 to the audio chunk unit 128, which means that information for packaging audio data is transmitted. Information to be transmitted will be described in detail in conjunction with the audio chunk unit 128 below.

The media restorer 143 decodes the chunk data by a decoder embedded in the web browser to restore the video, and outputs the restored video. In this case, the decoder embedded in the web browser may be a video tag. In the embodiment of FIG. 12, the media restorer 143 includes the MSE module 134 and the video tag module 135.

The MSE module 134 is a JavaScript API for HTML5, which is created for video streaming playback using HTTP download. This technology, standardized by the W3C, enables streaming playback on a game console such as Xbox and PlayStation 4 (PS4) or Chromecast browser.

The video tag module 135 performs decoding and rendering so that media is displayed on a web browser. Using the decoder of the video tag module 135 enables decoding with better performance than the decoder module 124 which has a limitation due to the dynamic language characteristic of JavaScript code. In other words, high resolution images and decoding of high frames per second (FPS) can be achieved.

To summarize the process of outputting video by the modules described above, the video data is separated from the data separator and transmitted to the container unit 142, and if the video data is not in the container format, the container unit 142 packages the frames in a unit number and converts them into chunk data. The video data composed of the chunk data is outputted through the decoding and rendering process in the media restorer 143. Next, a process of outputting audio data will be described.

The audio data separated by the data separator is depacketized in the depacketizing module 122b and is outputted in synchronization with the video data through the audio synchronizer 144. The audio synchronizer 144 may include the audio decoder 126, the audio chunk unit 128, the buffer controller 129 and the audio renderer 136.

The audio decoder 126 decodes the separated audio data by a script that can be parsed by a web browser. In this case, the script that can be parsed by a web browser may be JavaScript code.

The audio chunk unit 128 packages the audio data decoded by the audio decoder 126 to generate an audio chunk. Since the audio chunk unit 128 may package the audio data in a range corresponding to the chunk data generated by the container creating module 127, the audio chunk unit 128 receives information on the chunk data from the container creating module 127. An arrow with a dotted line connected to the audio chunk unit 128 from the container creating module 127 means that the information is transmitted.

Figure 16:
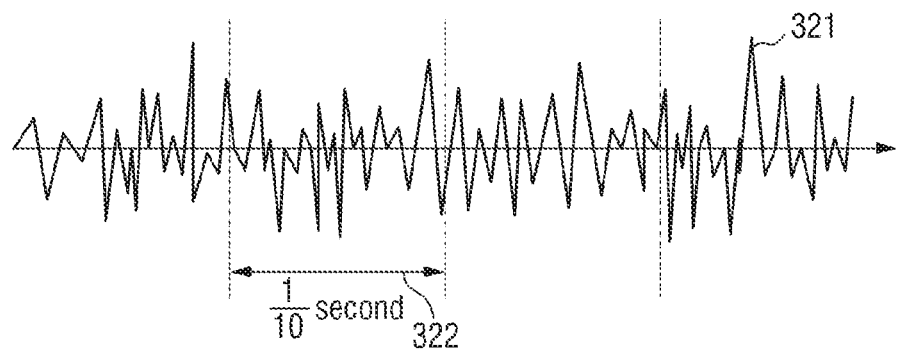
FIG. 16 shows a process of generating an audio chunk according to an exemplary embodiment.

The process of generating an audio chunk is described with reference to FIG. 16. Audio data 321 shown in FIG. 16 indicates audio data before being rendered in the audio renderer 136 after being decoded by the audio decoder 126 and then decompressed. The audio data 321 may be, for example, a wave (.wav) file as an audio signal represented by a digital value. Since the audio signal is defined as an amplitude depending on time due to its attributes, an audio signal in a range corresponding thereto can be extracted by cutting out an arbitrary section. For example, if the frame rate of the video data is 30 fps and the unit number of the frames constituting the chunk data in the container creating module 127 is 3, the container creating module 127 transmits information of 30 fps and the unit number 3 to the audio chunk unit 128. Since the time corresponding to one video frame is 1/30 second and the unit number is 3, the audio chunk unit 128 packages the audio data 321 in 1/10 second corresponding to three video frames to generate an audio chunk 322.

As described above, an audio chunk is audio data synchronized with chunk data, and the chunk data is generated by the container creating module 127. The chunk data is obtained by packaging video frames with a unit number or packaging audio in a unit number, and the audio chunk is obtained by packaging audio data in the unit number. For example, a unit number may be assigned to video frames and/or audio data. Further, the chunk data is compressed data before being decoded by a decoder 135a, and the audio chunk is data which is decoded by the audio decoder 126 and decompressed.

Referring again to FIG. 12, the buffer controller 129 receives the audio chunk from the audio chunk unit 128, buffers the audio chunk in the audio buffer, and provides the buffered audio chunk to the audio renderer 136.

The buffer controller 129 may control audio data to be outputted in synchronization with video data through buffering. More specifically, when the media restorer 143 transmits time information on a time point at which the video is outputted to a renderer 135b to the buffer controller 129 on the basis of chunk data, the buffer controller 129 buffers an audio chunk and provides the audio chunk to the audio renderer 136 at a timing point when video is outputted through the time information. An arrow with a dotted line from the renderer 135b to the buffer controller 129 in FIG. 12 indicates that the time information is transmitted from the media restorer 143 to the buffer controller 129. Here, the time information indicates the time point at which the chunk data corresponding to the time information is rendered in the renderer 135b, and a reference point of the time point when the chunk data is rendered may be a time point when a start portion of the chunk data corresponding to the time information is rendered by the renderer.

The audio renderer 136 performs audio rendering to output the audio chunk received from the buffer controller 129. The audio renderer 136 may be implemented with a Web Audio API supported by a web browser.

To summarize the process of outputting audio through the above-described modules, the audio data is separated by the data separator and transmitted to the audio decoder 126. The audio data is decoded and restored in the audio decoder 126, and the restored audio is packaged into an audio chunk in the audio chunk unit 128. The packaging is performed according to the unit number of frames constituting the chunk data. The audio data packaged into the audio chunk is buffered in the buffer controller 129 and outputted through the audio renderer 136 at a timing point when the video is outputted. In this case, the time point when the video is outputted is contained in the time information transmitted from the media restorer 143 to the buffer controller 129.

The media playback apparatus 120 shown in FIG. 12 synchronizes video data and audio data without transcoding audio data. Thus, there is no fear of damaging audio data due to transcoding. In addition, according to the media playback apparatus 120 of FIG. 12, even if the video data and the audio data are decoded by different decoders, since synchronization is not a problem, it provides an environment in which video data and audio data can be separately processed. That is, even if the audio data of the codec format not supported by the video tag is restored by a separate decoder, since synchronization is not a problem, the dependency on the codec format supported by the video tag is reduced.

FIG. 13 shows the media playback apparatus 120 according to another exemplary embodiment. In FIG. 12, the audio data is restored and then synchronized with the video data. On the other hand, in FIG. 13, the audio data is decoded and restored after being synchronized with the video data. Compared with the embodiment of FIG. 12, the position of the audio decoder 126 in the embodiment of FIG. 13 is changed to the rear end of the buffer controller 129. Since the other configuration is the same as that of the embodiment of FIG. 12, a redundant description will be omitted. Hereinafter, the changed audio synchronizer 144 will be described.

According to the embodiment of FIG. 13, the audio chunk unit 128 generates an audio chunk by packaging the audio data before being decoded and restored. The audio chunk unit 128 receives information on chunk data from the container creating module 127 to package the audio data in a range corresponding to the chunk data generated by the container creating module 127.

The buffer controller 129 synchronizes the audio chunk with the video data through the time information received from the renderer 135b and transmits the audio chunk to the audio decoder 126. In the embodiment of FIG. 13, the audio data synchronized with the chunk data is data before being decoded by the audio decoder 126, which is different from the embodiment of FIG. 12.

The audio decoder 126 restores the synchronized audio data and transmits it to the audio renderer 136, and the audio renderer 136 performs rendering to output the restored audio data.

In the embodiments shown in FIGS. 12 and 13, a case of synchronizing the audio data based on the video data has been described as an example, but on the other hand, it may also be possible to synchronize the video data based on the audio data.

The media data is referred to as first media data (audio) and second media data (video), and is applied to the embodiments of FIGS. 12 and 13.

The receiving unit 141 receives the media data and transmits the received media data to the data separator. The data separator separates the media data into the first media data (audio) and the second media data (video).

When the first media data (audio) is not in the container format, the container unit 142 packages the frames constituting the first media data (audio) together with a unit number and converts them into chunk data.

The media restorer 143 restores the first media data (audio) by decoding the chunk data by a decoder embedded in the web browser, and when outputting the first media data (audio), transmits time information on the corresponding time point to the synchronizer (corresponding to the audio synchronizer in FIGS. 12 and 13) on the basis of chunk data. In particular, the media restorer 143 may include a video tag module 135 that generates a video tag that specifies a movie clip or other video streams, and/or uses the video tag in decoding and rendering media data. The media storing unit 143 may include the decoder 135a that is embedded in the web browser and decodes the audio data based on the video tag. The media storing unit 143 may also include the renderer 135b that renders the audio data based on the video tag. Accordingly, it is not a problem that the media restorer 143 outputs the first media data (audio).

The synchronizer synchronizes the second media data (video) with the restored first media data (audio) based on the received time information.

As described above, a case where synchronized media can be reproduced according to the embodiments of FIGS. 12 and 13 even when the first media data is audio and the second media data is video has been described.

In this case, the first media data is audio and the second media data is video, which is merely a setting for illustrating various embodiments, and the types of the first media data and the second media data are not limited thereto.

Next, an exemplary embodiment of another structure of the media playback apparatus 120 will be described. FIG. 14 shows a media playback apparatus 120 according to another exemplary embodiment. The media playback apparatus 120 of FIG. 14 includes a receiving unit, a data separator, a container unit, a media restorer, and an audio restoring unit. In this case, the receiving unit, the data separator, the container unit, and the audio restoring unit may be implemented in JavaScript code. The media playback apparatus 120 of FIG. 14 may be configured by receiving the script converter of FIG. 9 and FIG. 10.

The receiving unit and the data separator are configured in the same manner as in FIG. 12. The receiving unit receives the media data generated by the media service apparatus 110, and the data separator separates the media data into video data and audio data. The separated video data is depacketized in the depacketizing module 122a and then transmitted to the container unit.

The container unit includes the container creating module 127. The container creating module 127 packages the frames constituting the video data together with a unit number and converts the frames into chunk data. In this case, the unit number of frames can be variably adjusted according to frames per second (FPS) of the video data.

The media restorer includes the MSE module 134 and the video tag module 135, and decodes the chunk data transmitted from the container unit to restore the video and output the restored video.

While the media restorer restores and outputs the video data, the audio restoring unit decodes and restores the audio data separated by the data separator, and outputs the restored audio data in synchronization with the video data outputted from the media restorer.

The audio restoring unit may include a transcoding unit. The transcoding unit includes the audio transcoder 123 that transcodes the audio data into another codec format. The audio transcoder 123 may transcode and output the audio data in a codec format supported by the video tag when the input audio data is in a format not supported by the media restorer, that is, a codec format not supported by the video tag.

The audio transcoded in the audio restoring unit is transmitted to the container creating module 127. When the video data received from the depacketizing module 122a is not in the container format, the container creating module 127 may packages the audio data received from the audio restoring unit together with a unit number while packaging the frames constituting the video data in the unit number, thereby generating chunk data. The generated chunk data can be transmitted to the MSE module 134 without a compatibility problem.

The process of decoding, rendering, and outputting audio data in the audio restoring unit may be included in the media restorer. This is because the container unit generates chunk data from video data and audio data. Thus, video data and audio data can be outputted by decoding and rendering the chunk data through the MSE module 134 and the video tag module 135 of the media restorer.

By using the media playback apparatus 120 of FIG. 14, it is possible to decode and render audio data in a codec format not supported by a video tag with a video tag through transcoding of audio data and conversion into chunk data. Therefore, since the audio data is restored together with the video data, it is possible to reproduce the media data without a synchronization problem.

Figure 17:
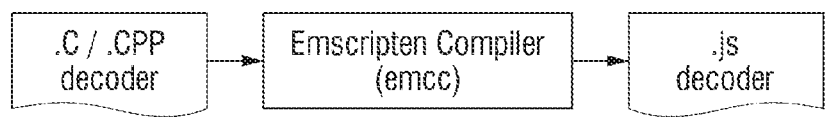
FIG. 17 illustrates a process of generating a script converter implemented in JavaScript code according to an exemplary embodiment.

FIG. 17 illustrates a process of generating a script converter implemented in JavaScript code according to an exemplary embodiment. Referring to FIG. 17, a script converter implemented in JavaScript code may be implemented by converting a source written in the conventional C and C++ native code using a converter such as Emscripten to obtain JavaScript code that can be used in a browser.

When using a converter such as Emscripten, it is possible to obtain a decoder or a container implemented in JavaScript code from conventional native code. Accordingly, there is an advantage that codec dependency can be lowered.

Since JavaScript code is used instead of a plug-in, it is unnecessary to worry about a browser's support interruption. In addition, there is no need to worry about whether to use the ActiveX interface or the NPAPI interface depending on the browser. That is, there is an advantage that the dependency on the browser can be lowered.

Figure 18:
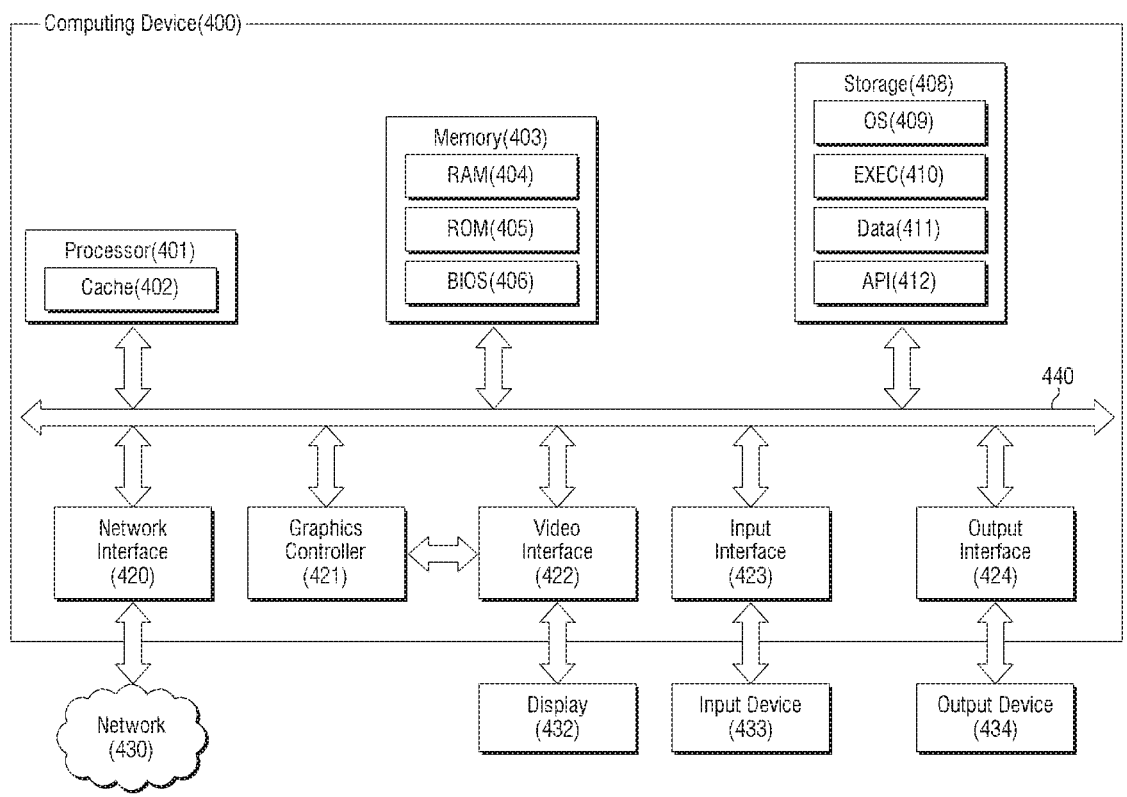
FIG. 18 illustrates a computing device for implementing the media playback apparatus according to an exemplary embodiment.

The media playback apparatus 120 shown in FIG. 1 may be implemented, for example, as a computing device 400 shown in FIG. 18. The computing device 400 may be, but is not limited to, mobile handheld devices (e.g., smart phones, tablet computers, etc.), laptop or notebook computers, distributed computer systems, computing grids or servers. The computing device 400 may include a processor 401, a memory 403 and a storage 408 that communicate with each other or with other elements via a bus 440. The bus 440 may be connected to a display 432, at least one input device 433, and at least one output device 434.

All of these elements may be connected to the bus 440 directly or via one or more interfaces or adapters. The bus 440 is connected to a wide variety of subsystems. The bus 440 may include a memory bus, a memory controller, a peripheral bus, a local bus, and a combination thereof.

The processor (e.g., a central processing unit (CPU)) 401 optionally includes a cache memory 402, which is a local storage for temporarily storing instructions, data, or computer addresses. The processor 401 executes instructions (or software modules) stored in a computer-readable storage medium, such as the memory 403 or the storage 408. The computer-readable storage medium may store software modules implementing particular embodiments, and the processor 401 may execute the stored software modules.

The memory 403 may include a random access memory (RAM) 404, a read-only memory (ROM) 405, and a combination thereof. Further, a basic input/output system (BIOS) (e.g., firmware) having basic routines necessary for booting the computing device 400 may be included in the memory 403.

The storage 408 is used to store an operating system 409, executable files (EXEC) 410, data 411, API 412, and the like. The storage 408 may be a hard disk drive, an optical disk drive, a solid-state drive (SSD), and the like.

The computing device 400 may include the input device 433. The user may enter commands and/or information into the computing device 400 via the input device 433. Examples of the input device 433 may include a keyboard, a mouse, a touch pad, a joystick, a game controller, a microphone, an optical scanner, and a camera. The input device 433 may be connected to the bus 440 via an input interface 423 including a serial port, a parallel port, a game port, a Universal Serial Bus (USB), and the like.

In some embodiments, the computing device 400 is connected to the network 430. The computing device 400 is connected to other devices via the network 430. In this case, the network interface 420 receives communication data in the form of one or more packets from the network 430, and the computing device 400 stores the received communication data for the processing of the processor 401. Similarly, the computing device 400 stores the transmitted communication data in the form of one or more packets in the memory 403, and the network interface 420 transmits the communication data to the network 430.

The network interface 420 may include a network interface card, a modem and the like. Examples of the network 430 may include the Internet, a wide area network (WAN), a local area network (LAN), a telephone network, a direct connection communication and the like, and a wired and/or wireless communication scheme may be employed.

The execution result of the software module by the processor 401 may be displayed through the display 432. Examples of the display 432 may include a liquid crystal display (LCD), an organic light-emitting display (OLED), a cathode ray tube (CRT), and a plasma display panel (PDP). The display 432 is connected to the bus 440 via a video interface 422 and the data transfer between the display 432 and the bus 440 can be controlled by a graphics controller 421.

In addition to the display 432, the computing device 400 may include at least one output device 434, such as an audio speaker and a printer. The output device 434 is coupled to the bus 440 via an output interface 424. The output interface 424 may be, for example, a serial port, a parallel port, a game port, a USB, or the like.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A media playback apparatus for synchronously reproducing video and audio on a web browser, the media playback apparatus comprising at least one processor to implement:

a receiver configured to receive media data generated in a media service apparatus using a communication protocol which supports web services;

a data separator configured to separate the received media data into video data and audio data;

a container configured to package frames constituting the video data together with a unit number representing a number of frames and convert the frames into chunk data wherein the chunk data is obtained by packaging video frames with the unit number or packaging video frames and audio with the unit number;

a media restorer configured to restore video by decoding the chunk data by a decoder embedded in the web browser, and provide time information on a time point at which the restored video is outputted on a chunk data basis when the restored video is outputted; and an audio synchronizer configured to output the audio data in synchronization with the restored video based on the time information provided on the chunk data basis.

2. The media playback apparatus of claim 1, wherein the container variably adjusts the unit number according to frames per second (FPS) of the video data.

3. The media playback apparatus of claim 1, wherein the media restorer includes a renderer renders the restored video before the restored video is outputted, and the time information comprises a time point at which the chunk data is rendered in the renderer.

4. The media playback apparatus of claim 3, wherein the time point at which the chunk data is rendered by the render corresponds to a start portion of the chunk data.

5. The media playback apparatus of claim 1, wherein the audio synchronizer decodes the separated audio data to restore audio, and outputs the restored audio in synchronization with the restored video based on the time information provided on the chunk data basis.

6. The media playback apparatus of claim 5, wherein the audio synchronizer comprises:

an audio decoder configured to decode the separated audio data based on a script which is configured to be parsed by the web browser;

a buffer controller configured to provide the decoded audio data to an audio renderer in synchronization with the chunk data; and the audio renderer configured to render the decoded audio data.

7. The media playback apparatus of claim 6, wherein the chunk data is compressed data before being decoded and the audio data synchronized with the chunk data is decoded and decompressed data.

8. The media playback apparatus of claim 6, wherein the audio renderer is implemented by an audio application program interface (API) supported by the web browser.

9. The media playback apparatus of claim 1, wherein the audio synchronizer buffers the separated audio data in synchronization with the restored video based on the time information provided on the chunk data basis, and decodes the buffered audio data to restore and output audio.

10. The media playback apparatus of claim 9, wherein the audio synchronizer comprises:

a buffer controller configured to buffer the separated audio data in synchronization with the chunk data;

an audio decoder configured to decode the buffered audio data based on a script which is configured to be parsed by the web browser; and an audio renderer configured to render the decoded audio data.

11. The media playback apparatus of claim 10, wherein the chunk data is compressed data before being decoded and the audio data synchronized with the chunk data is data before being decoded by the audio decoder.

12. The media playback apparatus of claim 1, wherein the decoder embedded in the web browser is a video tag player supported by a language for presenting content on world wide web, and the receiver, the container and the audio synchronizer are implemented by a programming language of world wide web.

13. The media playback apparatus of claim 12, wherein the programming language of world wide web is downloaded from the media service apparatus to the media playback apparatus.

14. A media service apparatus for transmitting media data to a media playback apparatus, the media service apparatus comprising:
a module storage configured to store a script converter to reproduce the media data on a web browser of the media playback apparatus; and
at least one processor configured to implement:
a module transmitter configured to transmit the script converter to the media playback apparatus in response to a connection between the media service apparatus and the media playback apparatus being established;
a packetizer configured to packetize the media data to generate a transmission packet; and
a web server configured to establish the connection and transmit the transmission packet to the media playback apparatus in response to a request from the media playback apparatus,
wherein the script converter is configured to receive the transmission packet through the connection, package video frames included in the transmission packet together with a unit number representing a number of frames and convert the frames into chunk data wherein the chunk data is obtained by packaging video frames with the unit number or packaging video frames and audio with the unit number, and output audio data included in the transmission packet in synchronization with the chunk data based on time information on a time point at which the chunk data is decoded and outputted by a media restorer installed in the media playback apparatus.

15. The media service apparatus of claim 14, wherein the script converter is code written in a programming language of world wide web which is configured to be parsed by the web browser.

16. The media service apparatus of claim 14, wherein the time point at which the chunk data is rendered by a renderer in the media playback apparatus corresponds to a start portion of the chunk data.

17. The media service apparatus of claim 14, wherein the script converter is configured to output the audio data in synchronization by decoding the audio data included in the communication packet to restore audio, and outputting the restored audio in synchronization with the chuck data based on the time information provided on the chunk data basis.

18. The media service apparatus of claim 14, wherein the script converter is configured to output the audio data in synchronization by buffering the separated audio data in synchronization with the chunk data, decoding the buffered audio data based on a script which is configured to be parsed by the web browser, and
rendering the decoded audio data.

19. The media service apparatus of claim 14, wherein the chunk data is compressed data before being decoded and the audio data synchronized with the chunk data is data which is decoded in the media playback apparatus and decompressed.

20. A media playback apparatus for synchronously reproducing video and audio on a web browser, the media playback apparatus comprising at least one processor to implement:
a receiver configured to receive media data generated in a media service apparatus using a communication protocol which supports web services;
a data separator configured to separate the received media data into first media data and second media data;
a container configured to package frames constituting the first media data together with a unit number representing a number of frames and convert the frames into chunk data wherein the chunk data is obtained by packaging video frames with the unit number or packaging video frames and audio with the unit number;
a media restorer configured to restore first media by decoding the chunk data by a decoder embedded in the web browser, and provide time information on a time point at which the restored first media is outputted on a chunk data basis when the restored first media is outputted; and
a synchronizer configured to output the second media data in synchronization with the restored first media based on the time information provided on the chunk data basis.

* * * * *